(12) United States Patent
Chan et al.

(10) Patent No.: US 10,664,771 B2
(45) Date of Patent: May 26, 2020

(54) PRODUCT DEVELOPMENT MANAGEMENT SYSTEM AND METHOD

(71) Applicant: NATIONAL CHUNG SHAN INSTITUTE OF SCIENCE AND TECHNOLOGY, Taoyuan (TW)

(72) Inventors: Tzu-Ming Chan, Taoyuan (TW); Yung-Chang Chou, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 329 days.

(21) Appl. No.: 15/831,581

(22) Filed: Dec. 5, 2017

(65) Prior Publication Data
US 2018/0189690 A1 Jul. 5, 2018

(30) Foreign Application Priority Data
Dec. 30, 2016 (TW) .............................. 105144080 A

(51) Int. Cl.
*G06Q 10/06* (2012.01)
*G06F 9/451* (2018.01)
(Continued)

(52) U.S. Cl.
CPC .............. *G06Q 10/06* (2013.01); *G06F 8/10* (2013.01); *G06F 8/20* (2013.01); *G06F 8/71* (2013.01);
(Continued)

(58) Field of Classification Search
CPC .......... G06Q 10/06; G06F 9/451; G06F 8/10; G06F 8/20; G06F 8/71; G06F 11/3688; G06F 11/3692
See application file for complete search history.

(56) References Cited

U.S. PATENT DOCUMENTS

| | | | |
|---|---|---|---|
| 8,806,450 B1 * | 8/2014 | Maharana ........... | G06F 11/3688 717/133 |
| 2005/0166094 A1 * | 7/2005 | Blackwell ........... | G06F 11/3664 714/38.14 |

(Continued)

FOREIGN PATENT DOCUMENTS

| TW | I312950 | 10/2002 |
|---|---|---|
| TW | I233732 | 4/2003 |

*Primary Examiner* — Lewis A Bullock, Jr.
*Assistant Examiner* — Theodore E Hebert
(74) *Attorney, Agent, or Firm* — Schmeiser, Olsen & Watts, LLP

(57) ABSTRACT

A product development management system presents the product specification traceability of the work items of the product requirement specification defining, the product function item planning, the product software and hardware architecture designing during the life cycle of the product development, such that the user and manager can handle the development work completeness, work item allocation and dispersion index and fineness index to which the specification item of each level extends. Through the product development management system of the present disclosure, the work team can understand the relation of their responsible engineering works, and establish confirmation and data change notification mechanism, so as to achieve a cooperation result. Meanwhile, the product development management system of the present disclosure can manage the specification change process of each level, accurately notify the essential party, and freeze the baseline specifications and engineering data by stages or by release times.

15 Claims, 10 Drawing Sheets

(51) Int. Cl.
*G06F 8/20* (2018.01)
*G06F 8/71* (2018.01)
*G06F 11/36* (2006.01)
*H04L 29/08* (2006.01)
*G06F 8/10* (2018.01)

(52) U.S. Cl.
CPC .......... *G06F 9/451* (2018.02); *G06F 11/3688* (2013.01); *G06F 11/3692* (2013.01); *H04L 67/10* (2013.01)

(56) References Cited

U.S. PATENT DOCUMENTS

2013/0152047 A1* 6/2013 Moorthi .............. G06F 11/3664 717/124
2017/0083290 A1* 3/2017 Bharthulwar ............. G06F 8/20

\* cited by examiner

| | | | | | | |
|---|---|---|---|---|---|---|
| R01. | taking off and landing without runway | F01. | multi-axes structure | | C01. | main structure |
| R02. | manual remote control | F02. | main body weight | | C02. | BLDC motor |
| R03. | remoting distance 1km | F03. | manual up/down control interface | | C03. | propeller |
| R04. | hanging time 20min | F04. | manual navigation control interface | | C04. | four-axes frame |
| R05. | total weight <=1300g | F05. | manual speed control interface | | C05. | camera supporter |
| R06. | fast speed 10m/s | F06. | posture control function | | C06. | Li-Iron battery of the aerial photographer |
| R07. | fixed hover in air | F07. | residual electricity monitoring | | C07. | flight control main board |
| R08. | return automatically | F08. | space recognized location | | C08. | MCU controller |
| R09. | recordable time 30min | F09. | recording taking off position | | C09. | gyroscope |
| R10. | image quality HD1080P | F10. | wireless remoting band | | C10. | GPS receiver |
| | | F11. | wireless remoting power | | C11. | power meter |
| | | F12. | battery capacity of the aerial photographer | | C12. | gravity sensor |
| | | F13. | battery weight of the aerial photographer | | C13. | Tx/Rx module of the aerial photographer |
| | | F14. | camera lens type | | C14. | remoter integration |
| | | F15. | camera CMOS specification | | C15. | RF Tx/Rx module |
| | | F16. | camera operating function | | C16. | handhold set |
| | | F17. | camera memory size | | C17. | control function button |
| | | F18. | camera weight | | C18. | Li battery set |

FIG. 10

PRODUCT DEVELOPMENT MANAGEMENT SYSTEM AND METHOD

CROSS-REFERENCE TO RELATED APPLICATION

This non-provisional application claims priority under 35 U.S.C. § 119(a) on Patent Application No(s).105144080 filed in Taiwan, R.O.C. on Dec. 30, 2016, the entire contents of which are hereby incorporated by reference.

FIELD OF THE INVENTION

The present disclosure relates to a systems engineering field, in particular, to a product development management system and method which can examine and control traceability of product specifications, functions, components and test cases.

BACKGROUND OF THE INVENTION

The product developments of enterprises have two categories, one category is developed according to the accepted customer's requirements, and another one category is developed according to the analysis of market requirements. To sum up, these are developed according to the product requirements. Knowing from the product requirements, the product development begins, and in the life cycle of the product development, the engineers with expertises of different technical fields (such electronics, mechanic, material, information and so on) should cooperate. From the confirmation of requirement specification, extension of function specification, to the product component architecture and detailed design specification, the negotiations between the upstream and downstream companies and the negotiations between lateral companies should be required. The tasks in the individual professional field may be executed by specific tools, but the tools or system with efficient cooperation and negotiation in the engineer integration of cross-fields and cross-stages is still lacked.

It is most miserable that a stage part does not meet another one stage part in the product development, such that the requirement may be misunderstood or missed, or a plurality of functions which are not wanted by the customer may be implemented in the product. In the product development of different industrials, the product requirement should be analyzed firstly to specify the characteristic requirement of the product, then, the design, production and test tasks are specified and allocated to different departments according to the characteristic requirement, and next, the product is actually produced. In the product development, if the characteristic requirement of the product is changed, the design and production line of the product should be instantly adjusted according to the change, and depending on the characteristics of the industrials, a large amount of labors and tasks in the factories may be adjusted. Meanwhile, it inevitably causes the problem whether the allocation of load and processional degree for a same company or a work team is proper or not. Lacking of related system engineering management tool in the production work, the little change of the product specification requirement causes much time which other departments try to find the changed component or field, and the actual solution is to spend labors to look up the large amount of the specification documents, which is a big burden of labor usage and work precision. If the relations and conversion processes of the lateral operation function interfaces between the product components (such as electric/mechanic/service) are not controlled well, it is easy to cause the system integration failures. The main subject matter of the test verification is the function specification, and the design test item and the test case are used to verify the specific functions and its combination. The extension of engineering specification should be proper in the product development, and in view of the traceability between the upstream and downstream, the concentrated or dispersed parts have higher potential failure risks. Thus, it is a big challenge for the enterprise manager and system engineering specification man to keep the flexibility of the engineer data change between teams, and to confirm the correct negotiations between the teams.

TW patent 1233732 discloses a cooperation platform, system and session management method, the cooperation platform specifies the access priority of the session owner to limit the data access, but the issued patent does not have discussion on how to coordinate the tasks of different terminal device and to unify the requirement specification baselines. TW patent 1312950 discloses a cooperation system an method between different organizations, the issued patent asks each unit in the organizations should process the design, production, test and so on according to the same one product specification, but the issued patent has no discussion on system adaption of design specification change and load allocation of specific specification; that is, when the product specification is changed, the whole system should be restarted an designed, which spends a large amount of labor and time, and the manager cannot the load allocations of units are reasonable and proper.

SUMMARY OF THE INVENTION

To solve the disadvantages of the prior art, the present disclosure provides a product development management system, which presents the product specification traceability of the work items of the product requirement specification defining, the product function item planning, the product software and hardware architecture designing during the life cycle of the product development, such that the user and manager can handle the relation of the upstream and downstream and the work completeness and work item allocation status of each stage. By using the product development management system of the present disclosure, the work team can understand the relation of their responsible engineering works, so as to achieve a cooperation result. Meanwhile, the product development management system of the present disclosure can manage the specification change process of each level, accurately notify the essential party, and orderly freeze the baseline specifications and engineering data.

The present disclosure provides a product development management system, comprising: a product requirement specification module, used to establish product requirement specification items of a product; a product function item module, used to categorize the product requirement specification items according to professional technical fields, so as to generate product function items corresponding to the product requirement specification items; a product component module, used to establish corresponding product component items according to the product function items; and a product test module, used to establish corresponding product test items according to the product function items; wherein the product development management system is installed in at least one computer host, and linked to user terminal devices via a communication network, by using a human-machine interface, each user terminal device browse and manages contents of the product requirement specification items, the product function items, the product component items and the product test items which the development management system establishes, and further to manage traceability between items; when the contents of one item are changed, the product development management system generates alarming marks on the changed item and other items with traceability relation of the changed item.

In one embodiment of the present disclosure, each of the product requirement specification module, the product function item module, the product component module and the product test module is installed in a single computer host, and the modules communicate with each other and link to the user terminal devices in the same time via the communication network.

In one embodiment of the present disclosure, the product requirement specification module, the product function item module, the product component module and the product test module are installed in a central computer host, and the user terminals communicate with each other via the communication network, and use different modules to cooperate according to different authorized priorities of the user terminals.

The work items in the specification of the present disclosure are known as the product requirement specification items, the product function items, the product component items and the product test items.

In one embodiment of the present disclosure, when the contents of one item is changed (for example, the work item contents are modified, the work item has been deleted or the work of the work has been finished), the product development management system generates alarming marks on the changed item and other items with traceability relation of the changed item, so as to notify the user and the upper manager to know some item contents in the whole product development chain are changed, and to quickly and accurately know the synchronously affected item contents. When the contents of the product requirement specification items, the product function items, the product component items and the product test items are updated or confirmed, the product development management system uses a hash function to generate a hash value. Any deletion and change instantly changes the hash value of the item, and corresponding tables recording traceability of upstream and downstream items also records an upstream item hash value of a current state. When the hash value is inconsistent with the current state, a downstream item principal is notified automatically.

In one embodiment of the present disclosure, In one embodiment of the present disclosure, the product development management system stores an electronic document associated with the product demand specification items, the product function items, the product component items and the product test items, and supervises deletion and change of the electronic document by using a hash function to hash the electronic document.

In one embodiment of the present disclosure, the traceability of the product requirement specification items and product function items is presented by a product function item and traced product requirement specification table, the traceability of the product function items and the product component items is presented by a product component and traced product function item table, and the traceability of the product test items and the product function items is presented by a product test item and traced product function item table. Via the human-machine interface, the user terminal device browses the above tables, so as to know the traceability of the work items in the product development management system, for example, the relation that some product specification corresponds to one specific function, the specific function is allocated to some component structures (maybe software or hardware), and some test item of the product is used to verify those product function specification. The upper manager can view the contents of the work items and the tables recording the traceability, to examine the allocation status of each work item, check confirmation status of each work item to know the completeness of work, and further adjust the contents of each work item according to the actual condition. Thus, the product development management system of the present disclosure also has function of controlling work loading and work completeness.

In one embodiment of the present disclosure, the product requirement specification item generated by the product requirement specification module has contents of target product specifications to be managed. The target product specifications is the reference of the product development, for example, the specification requirements of the customers, the specification requirements of the markets, the law requirements of the product, the requirements of the industrial specification, and these specification requirements or requirements can be classified into two kinds of function and non-function. The functional requirement can be further classified into detailed kinds (such as, customer favorite, specific shape design and so on), or the enterprise (or the product development unit) can define the classified kinds of safety, low requirement and so on for the specification requirements. The product requirement specification module of the present disclosure can list the product requirement specification items, each product requirement specification item can have unique product requirement specification number, and the product requirement specification item further records the requirement specification name, the requirement specification content description, the requirement reference document name and document number, the specification content reference electronic file, the requirement category, the requirement authentication manner, the hash value of the requirement specification electronic file, the hash value of the requirement specification characteristic, states and so on. The requirement authentication manner specifies the authentication manner of each product requirement specification item, (such, checking by eyes or testing by instruments), which can be considered by the following verification and testing work. In one embodiment of the present disclosure, the certification manners can be classified into four kinds according to the seriousness, and they are E: examination, D: demonstration, T: testing, and A: analyzing. The actual certification manner can be determined according to the actual requirements, and the present disclosure is not limited thereto.

In one embodiment of the present disclosure, the product function item module extends the product requirement specification items of the product development to product function items of definite function or performance requirements in view of the engineering profession, each product function item has the hierarchical relation which one may comprises another one. The product function item module can list the product function items of the product, and each product function item has a unique product function number, and each product function item further records the function item name, the function contents description, the linked electronic file of the function contents, the hash value of the linked electronic file of the function contents, the hash value of the function characteristic, states and so on. The product development management system provides a human-machine interface for setting and displaying the relation of the individual product function item traces back to one or more requirement specifications, and recording the relation in the traceability table of function items and requirement specifications. The product development management system of the present disclosure further provides another one human-machine interface for displaying the relation of the product function item and 0, 1 or more key dimension parameters, and the relation is recorded in a traceability table of the function items and the dimension parameters. The product development management system of the present disclosure also provides another one human-machine interface for setting and displaying the relation which the individual product function item is allocated in one or more product components, and the allocation defines the described function or performance requirements which the operation of the product component can achieve. The product function item can be also used to define the interface operation relation between two product components, and the two product components can trace to the product function item, to achieve the horizontal tracing effect of the interacting operations of the product components.

In one embodiment of the present disclosure, after the product component module performs the function categorization and structure design on the target product, the established software and/or hardware components are managed by a tree structure relation. In the definition of the present disclosure, the structure is formed the leaf components and combination components formed by the components. In the product development management system, the contents of the product component items present the software and/or hardware components which form the product, and each product component item has a unique product structure number, and further records the structure number of the upper level component (virtual combination), component name, component description, component type, current level allowance, component design structure, electronic file related to component structure design, hash value of electronic file related to component structure design, hash value of component structure characteristic, state and so on. The product development management system of the present disclosure further provides a human-machine interface for setting and displaying a relation which a product component (recorded in the contents of the product component item) traces to one or more product function items, and records a traceability table of the component and the function items, so as to presents the content requirement of the product function item which the product component meets.

In one embodiment of the present disclosure, all work data and related electronic files of the product development management system are stored in at least one database, and the database can be a physical hard disk, a server or a cloud database.

In one embodiment of the present disclosure, the hash values of the electronic files of the requirement specifications, related function contents, component designs have fixed lengths, and are obtained by using the hash function (such as MD5, SHA-2) based upon the contents of the electronic files when the electronic files are uploaded to and stored by the database of the system. The hash values of the characteristics of the requirement specifications, functions and component designs have fixed lengths, and are obtained by a hash function (such as MD5, SHA-2) before the record is updated and stored by the system database and after the record is fetched to be concatenated with data (not comprising the electronic file hash values) in other fields.

In one embodiment of the present disclosure, the value of state field can be one of E: editing, C: confirmation, F: frozen, T: terminated and D: deleted (not displayed). The state field can be maintained by the data principal (E/C/T) and the examiner (E/C/F/T/D).

In one embodiment of the present disclosure, the product test module of the present disclosure can verify the product function items of the product development target by executing the planned test items and test cases. The contents of the test items and the test cases are recorded in the contents of the product test items. Each product test item has a unique product test number, and further records the test item name, test title description, test level, test prerequisite, test environment and so on. The product development management system of the present disclosure provides a human-machine interface for setting and displaying a relation which the product test item traces back to one or more product function items, so as to present the product function item requirement which the product test item verifies. In one embodiment of the present disclosure, under each product test item, one or more test cases can be designed according to the title characteristic of the item, so as to cover the representative test environment, the test case should records the planned test steps, and each test case under the product test item has a non-repeated case number. The contents of each test case records not only the product test number and test case number of the product test item, but also the test case name, test case description, test input, pass rule of test and one or more test steps. Each test step comprises the step order, operation indication, and expected interaction. The product development management system further provides a human-machine interface for setting and displaying a relation which the product test item or the product test case traces back to one or more product function items, and the relation is recorded in the traceability table of the product test items and the product function items, so as to present the product function item requirement which the product test item or product test case verifies.

In one embodiment of the present disclosure, the product development management system further comprises a product measuring parameter module, wherein the product measuring parameter module can be built in the host of the product development management system, the product measuring parameter module is used to supervise product measuring parameters related to important characteristics and key performances of product development, and to establish product measuring parameter items of the product, and each product measuring parameter at least traces one specific product function item, and traces development via test results. The product measuring parameter item records a unique number of the product measuring parameter, the measuring parameter name, the measuring parameter definition, the measuring parameter descriptions, the measuring manner, the measuring unit, tolerance range and so on. The product measuring parameter module can establish and maintain the above information. During the product development, the product measuring means to previously set the specific key performance of the product, to plan stage targets of the key performance or results, i.e. before the final target is achieved, one or more stage target are set (for example, before 100% performance requirement is achieved, stage targets of 30%, 60%, and 90% key performance can be set), to check whether the delayed achieved date of the stage target affect the proceeding of the whole product development chain, and to adjust or modify the product development plan regarding the specific performance requirement. In one embodiment of the present disclosure, the product measuring parameter module can provide an expected planning function of the product measuring parameter development, the user can register one or more data via a human-machine interface, and the expected planning data comprises a unique number of the measuring parameter item, the expected parameter value, the expected achieving data and so on. In one embodiment of the present disclosure, the product measuring parameter module can provide a recording, tracing and comparing function of the actual product measuring results, the user can record recording data of one or more actual product measuring results via the human-machine interface, and the recording data of the actual product measuring results comprises the unique number of the measuring parameter item, the measuring data, the actual measuring date and so on. The product measuring parameter module can further provides a establishing and maintaining function of the relation of the product measuring parameter and one or more product function items to the user to operate it via the human-machine interface.

In one embodiment of the present disclosure, the product development management system can control or prohibit any change of contents of the specific items, so as to freeze a current product development state and control the specific baseline version. The version freezing (stop updating) control occurs when the product engineering development reaches the specific stages (such as, formal test or formal production), or the development information of the product should be released. The product development management system can prohibit any change of items by stage or by times, so as to freeze a current product development state and establish baseline data corresponding to the stages.

The product development management system of the present disclosure inputs the contents of the product requirement specification items, the product function items, the product component items and the product test items, and the traceability of the items into a hash function, and generates a hash value after each item is confirmed. When any one work item of product development chain in the product development management system changes, the hash value from the hash function changes, and via the eye-catching alarming notification of the human-machine interface, the related user and the upper manager can know and control the change of the work item of the system instantly, and further know and control the affected range of the change. Before the content data of any work item is edited or deleted, the product development management system checks whether the change work item has the relation to the other work items. If the work item has no relation to the other work items, the work item will be allowed to be edited or deleted; if the work item has the relation to the other work items, the alarming notification will be transmitted and direct and/or indirect affected range will be displayed on the human-machine interface.

In one embodiment of the present disclosure, the product requirement specification module, the product function item module, the product component module, the product test module and the product measuring parameter module can be individually built in a hardware of a computing unit, or built by a software in a single one computer host, and the user can select one or more modules to build the selective module by the software or hardware. Or alternatively, each module is built in the individual one computer host, and communicates with other modules by a communication network to form the product development management system, and the user terminal devices are allowed to link to the communication network, such that when the user links to the communication network, the user can use the management function of the product development management system, wherein the communication network can be a wired or wireless network.

In one embodiment of the present disclosure, product development management system can compute and display the completeness index of each work item, and the dispersion index and the fineness index of the traceability of upstream and downstream items, so as to provide objective quality indices to upper manager to handle the work items or persons which may have risk or should be careful.

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

BRIEF DESCRIPTION OF THE DRAWINGS

Drawings of the present disclosure are listed as follows:

FIG. 10 is a schematic diagram showing traceability of an application of camera drone by using a product development management system according to one embodiment of the present disclosure.

DETAILED DESCRIPTION OF THE PREFERRED EMBODIMENTS

Figure 1:
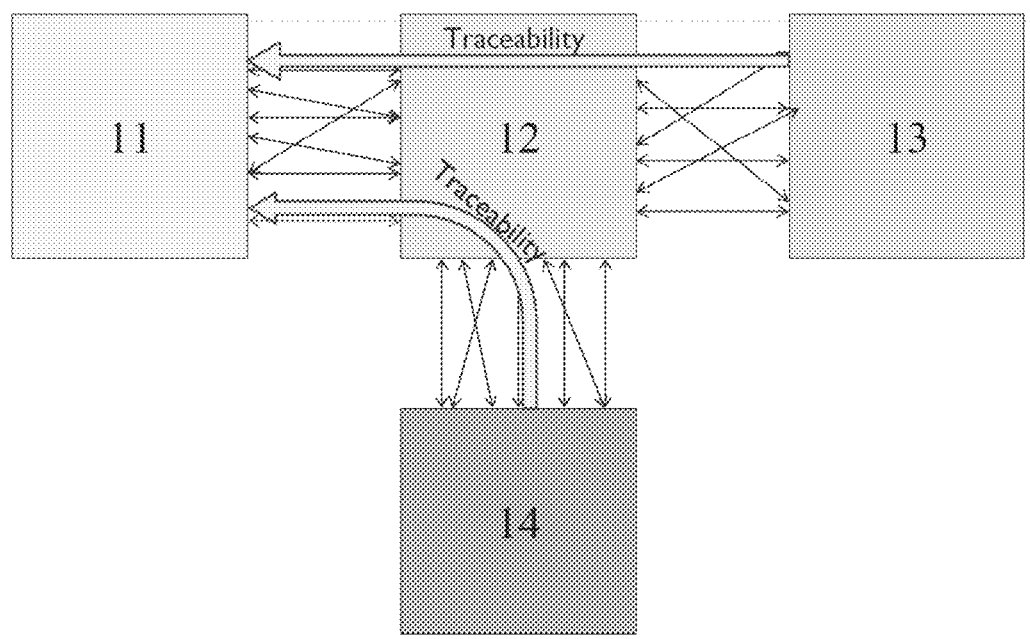
FIG. 1 is a schematic diagram showing a product development management system according to one embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
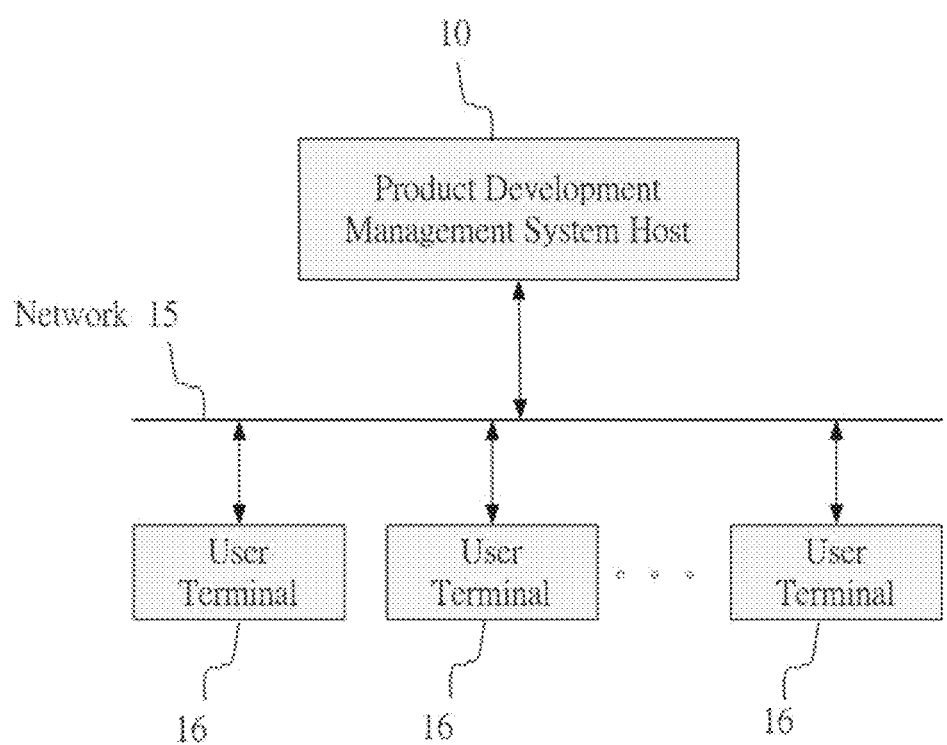
FIG. 2 is a schematic diagram showing a product development management system according to one embodiment of the present disclosure.
Figure 3:
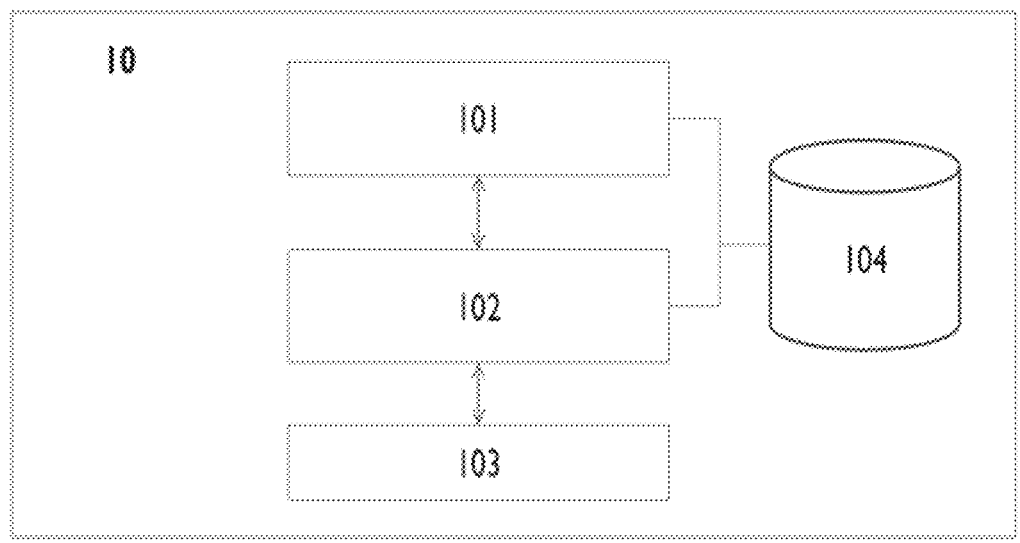
FIG. 3 is a schematic diagram showing a product development management system according to one embodiment of the present disclosure.

Referring to FIG. 1 through FIG. 3, FIG. 1 through FIG. 3 are schematic diagrams showing a product development management system according to one embodiment of the present disclosure. As shown in the drawings, the product development management system comprises: a product requirement specification module 11, used to establish product requirement specification items of a product; a product function item module 12, used to categorize the product requirement specification items according to professional technical fields, so as to generate product function items corresponding to the product requirement specification items; a product component module 13, used to establish corresponding product component items according to the product function items; a product test module 14, used to establish corresponding product test items according to the product function items. Referring to FIG. 2, the product development management system 10 is installed in a computer host, and links to the user terminal devices 16 via a communication network, each user terminal device 16 manages contents of the product requirement specification items, the product function items, the product component items, the product test item and traceability of the work items, established by the product development management system 10 via the human-machine interface. When the contents of any one item change, alarming marks are generated on the changed item and other items with traceability relation of the changed item. The users can be the roles comprising requirement specification maintainers, product function planners, product structure designers, the product test verifiers, product development engineering managers (upper managers), product measuring parameter maintainers, product engineering baseline managers (upper managers) and system managers (upper managers).

Referring to FIG. 3, in one embodiment of the present disclosure, the modules of the product development management system 10 are built in the host and comprise a processing program 101 of product development engineering management flow (use to manage the product development chain flow of the product development management system 10), a managing program 102 of product development management data authority (used to manage the access operation priority of each user), a human-machine interface program 103 (use to provide a human-machine interface to each user to browse and change the contents of work items and other information of the product development management system 10) and a database 104 (used to store the engineering data of the product, work item data of the product development management system and other information).

Figure 4:
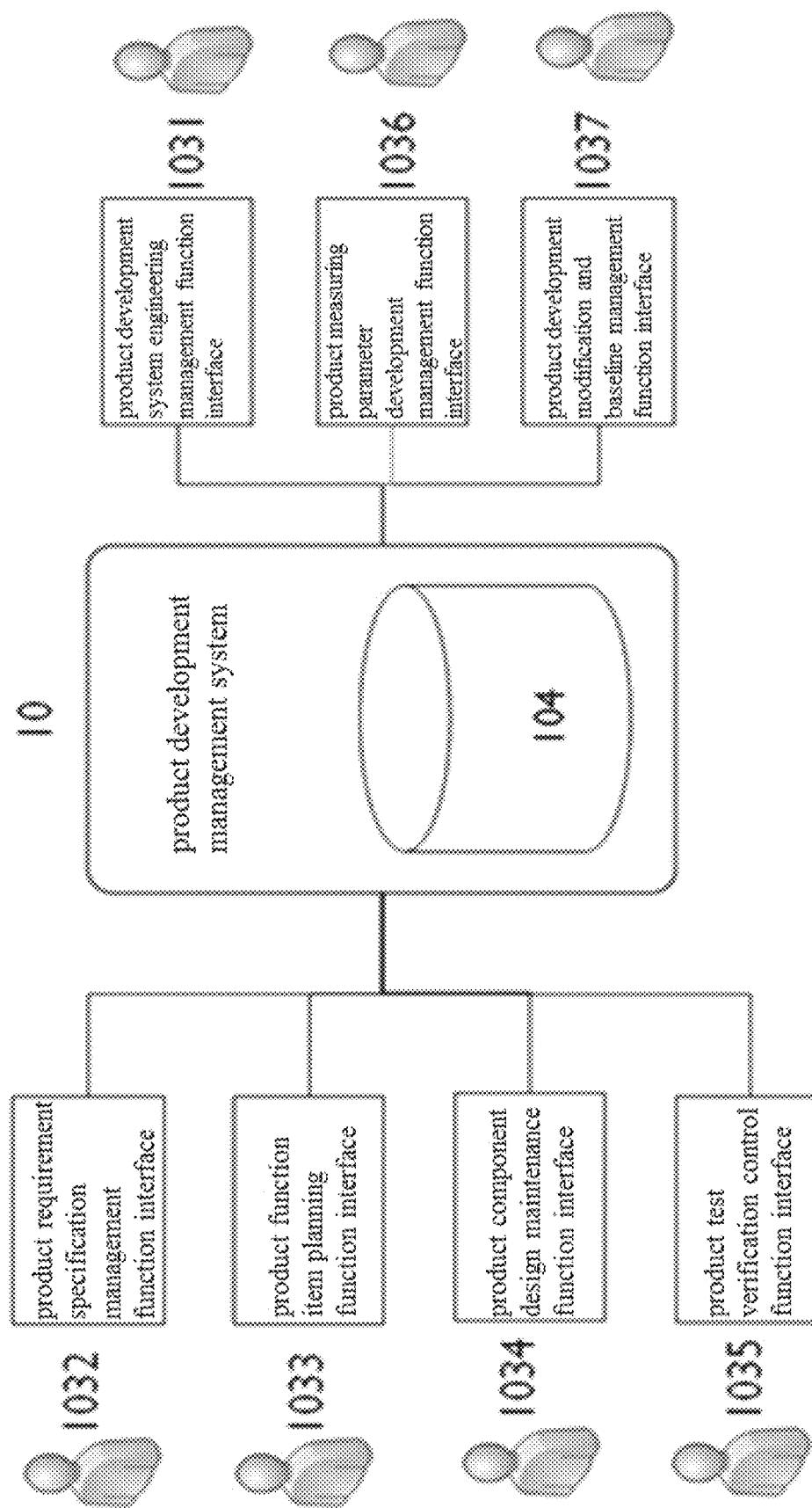
FIG. 4 is a schematic diagram showing an operation function interface provided by a human-machine interface program of a product development management system according to one embodiment of the present disclosure.

Referring to FIG. 4, the product development management system 10 of the present disclosure provides operation functions to each user via the human-machine interface program, the operation function interfaces comprise a product development system engineering management function interface 1031, a product requirement specification management function interface 1032, a product function item planning function interface 1033, a product component design maintenance function interface 1034, a product test verification control function interface 1035, a product measuring parameter development management function interface 1036 and a product development modification and baseline management function interface 1037. The operation histories and related data (such as related electronic files of the work items) which each user uses the function interfaces are stored in the database 104.

In one embodiment of the present disclosure, the product development system engineering management function interface 1031 provides a product development system engineering management function, such that the user can register the basic data of the product development and assign a unique number to each product, and the product development system engineering management function interface 1031 further provides a search function for the product list within the enterprise. Accordingly, the user can select the specific product to perform the top down management, such as the examination of the product requirement specification listing (comprising adjusting/freezing), the examination of the product function item listing (comprising adjusting/freezing), the examination of the product design structure listing (comprising adjusting/freezing), the examination of the product test item planning (comprising adjusting/freezing), the examination of the product test planning (comprising adjusting/freezing), the examination of the product key performance parameters (comprising adjusting/freezing).

In one embodiment of the present disclosure, the product development management system manages the traceability of the work items, and after the user selects the specific product, the user can perform the following managements: the examination which the product function item traces to the requirement specifications (comprising adjusting/freezing), the examination which the product function item is allocated in the product components (comprising adjusting/freezing), the examination which the product component traces to the product function items (comprising adjusting/freezing), the examination which the product test item planning traces to the product function items (comprising adjusting/freezing), the examination which the product test case planning traces to the product function items (comprising adjusting/freezing) and the examination which the product key measuring parameter corresponds to the product function items (comprising adjusting/freezing).

Figure 5:
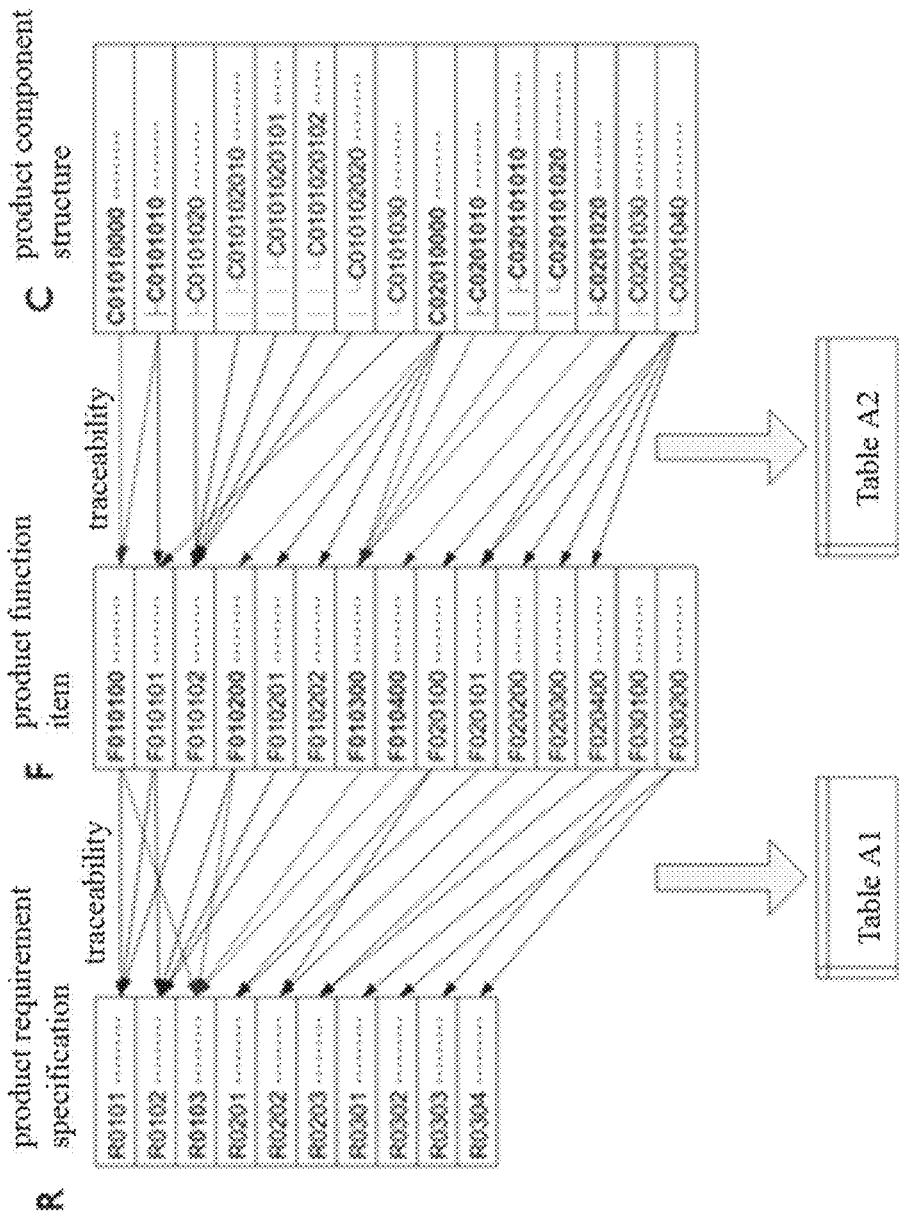
FIG. 5 is a schematic diagram showing traceability of work items of a product development management system according to one embodiment of the present disclosure.
Figure 6:
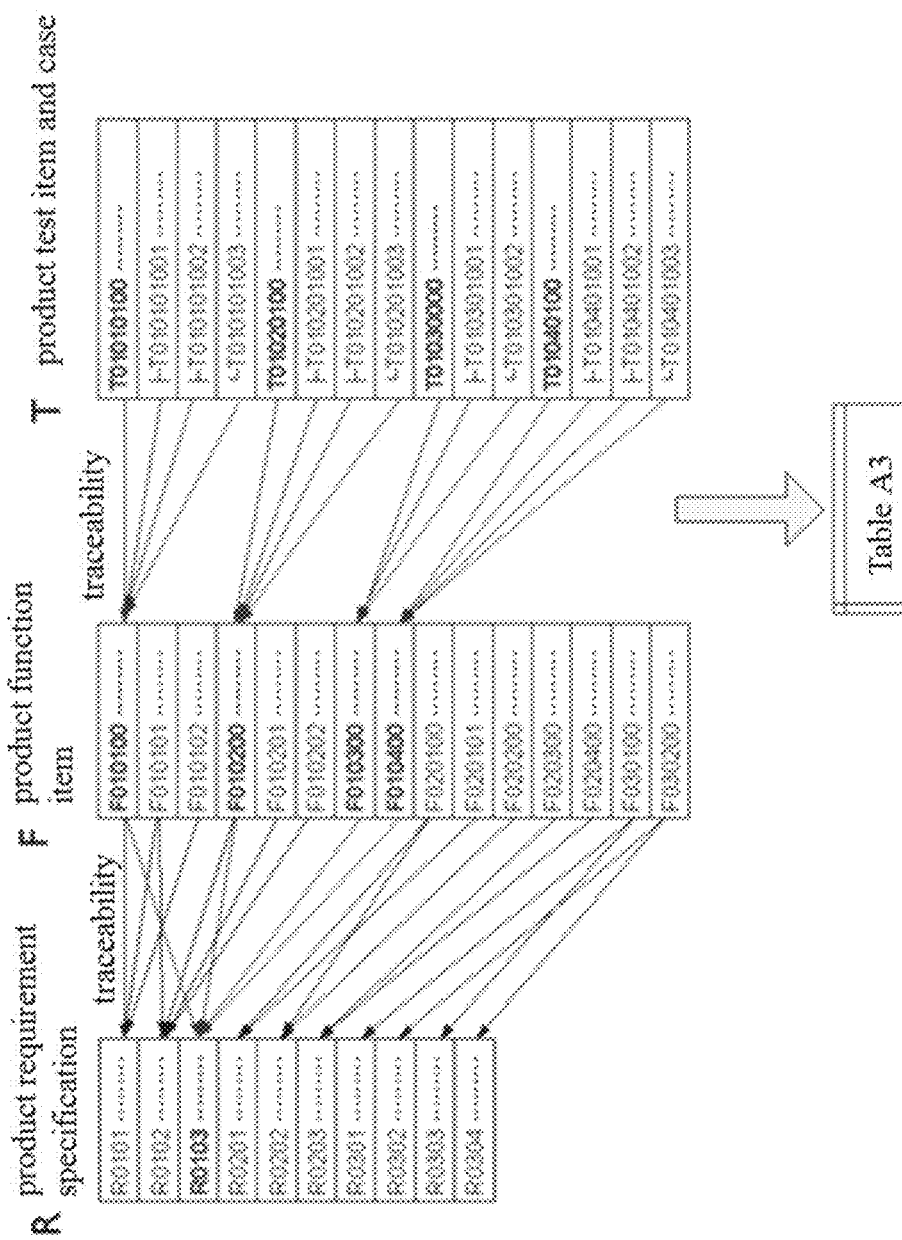
FIG. 6 is a schematic diagram showing traceability of work items of a product development management system according to one embodiment of the present disclosure.

FIG. 5 and FIG. 6 are schematic diagrams showing traceability of work items of a product development management system according to one embodiment of the present disclosure. As shown in the drawings, row R presents the product requirement specification items, row F presents the product function items, row C presents the product component items, and row T presents the product test items. The traceability of the product requirement specification items and the product function items can be presented by a traceability table A1 of function items and requirement specifications, and the traceability of the product function items and the product component items can be presented by a traceability table A2 of the product component structures and the product function items. The traceability of the product test items and the product function items can be presented by a traceability table A3 of the product test items and the product function items. From the established traceability in the drawings of the present disclosure, the relations and numbers which the work items trace others can be known. For example, the product requirement specification item R0304 is traced by the product function item F030200. However, the product function item F030200 is not only related to the product requirement specification item R0304, but also related to the product requirement specification item R0302. Thus, from the established traceability, the relations of work items can be clearly known during the product development process. It is noted the traceability in FIG. 5 and FIG. 6 are just one exemplary embodiment, the person with ordinary skill in the art can modify these according to the actual requirements, and the present disclosure is not limited thereto.

In one embodiment of the present disclosure, the product development management system can check whether the traceability of the work items have the tracing misses. After the user selects the specific product, the tracing misses of each loop in the system engineering development can be alarmed, and the tracing misses can be the dual tracing misses of the product function items and the product requirement specifications, the dual tracing misses of the product function item and the product structures, the dual tracing misses of the product test items and the product function items, the dual tracing misses of the product test cases and the product function items and the tracing misses of the product key measuring parameters and the product function items.

In one embodiment of the present disclosure, the product development management system can compute and present the completeness index of each work item in each stage of the product development, and the completeness comprises the confirmation completeness of the requirement specification, function item, component structure and test item (case). The confirmation completeness of the work item can be presented percentage (such as 40% or 60%), achieved item number (such as 50/100) or by other presentation manner.

Figure 7:
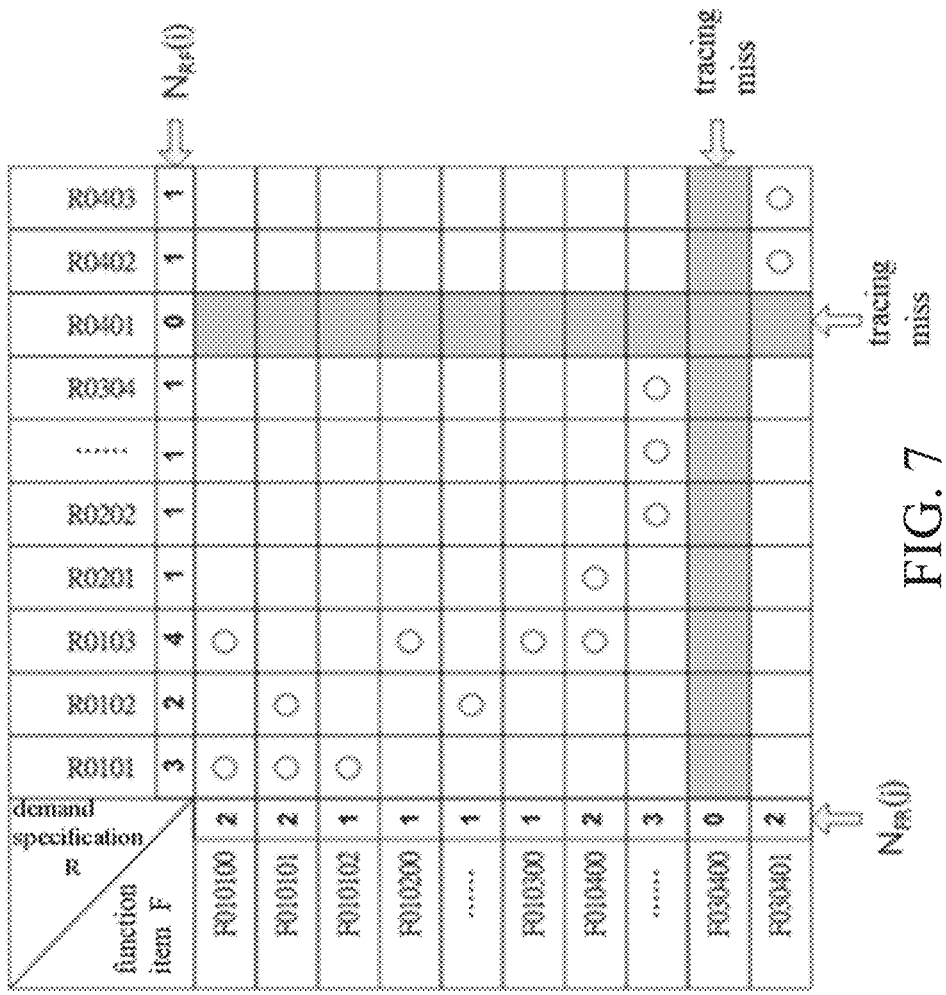
FIG. 7 is a schematic diagram showing one display interface of a traceability table of function items and requirement specifications according to one embodiment of the present disclosure.

FIG. 7 is a schematic diagram showing one display interface of a traceability table of function items and requirement specifications according to one embodiment of the present disclosure. Row R presents the product requirement specification items, and row F presents the product function items. The mark "○" presents the work items in rows R and F have the traceability, and the tracing misses and that the work item have no corresponding other work items is marked with an eye-catching alarm mark. It is noted that the format, content, and presentation manner of the table can be modified by the person with the ordinary skill in the art according to the actual requirements, and the present disclosure is not limited thereto.

Further referring to FIG. 7, in one embodiment of the present disclosure, the product development management system can manage the fineness indices and the dispersion indices of the traceability of the work items. When the user selects the specific product, the quality indices of each loop in the system engineering development can be calculated, such as the dispersion/fineness indices which the product function items bi-directionally trace to the product requirement specifications (p.s. the term "bi-directionally trace" means one and another one items can trace to each other, i.e. dual tracing direction), the dispersion/fineness indices which the index product function items bi-directionally trace to the product structure, the dispersion/fineness indices which the product test items bi-directionally trace to the product function items and the dispersion/fineness indices which the product test cases bi-directionally trace to the product function items. In one embodiment of the present disclosure, take the dispersion/fineness indices which the product function items bi-directionally trace to the product requirement specifications as an example, the definition and the management aspect thereof are illustrated as follows:

the dispersion index $D_{FR}$ which the product function item traces back to the product requirement specification item is defined as follows:

an accumulated value of $N_{FR}(j)$ of the product function items is divided by leaf function item summation number m, i.e. $D_{FR}=(\Sigma N_{FR}(j))/m$, j=1–m;

wherein $N_{FR}(j)$ means a number which the individual product function item traces backs to the product requirement specification items;

if $N_{FR}(j)$ is 0, this means a tracing miss of the production function item;

if $N_{FR}(j)$ is larger than a threshold value d1 (such as 3), this means the product function item is too general, and should be decomposed; and if $D_{FR}$ is larger than a threshold value d2 (such as 2.5), this means the product function item seems too general; and the fineness index $F_{RF}$ which the product requirement specification item extends to the product function items is defined as follows:

an accumulated value of $N_{RF}(i)$ of the product requirement specification items is divided by a total number n of the product requirement specification items, i.e. $F_{RF}=(\Sigma N_{RF}(i))/n$, i=1–n;

wherein $N_{RF}(i)$ means a number which the individual product requirement specification item extends to the product function items;

if $N_{RF}(i)$ is 0, this mean a tracing miss of the product requirement specification item;

if $N_{RF}(i)$ is larger than a threshold value d3 (such as 10), this means whether the content of the product requirement specification is reasonable should be checked;

if $F_{RF}$ is less than a threshold value d4 (such as 2.5), this means a technical category which the product requirement specification item of the product extends to the product function items is not fine, for example, single one function may meet too many requirement specifications; and if $F_{RF}$ is larger than a threshold value d5 (such as 8), this means the product requirement specification item of the product is too ambiguous or not definite enough.

Figure 8:
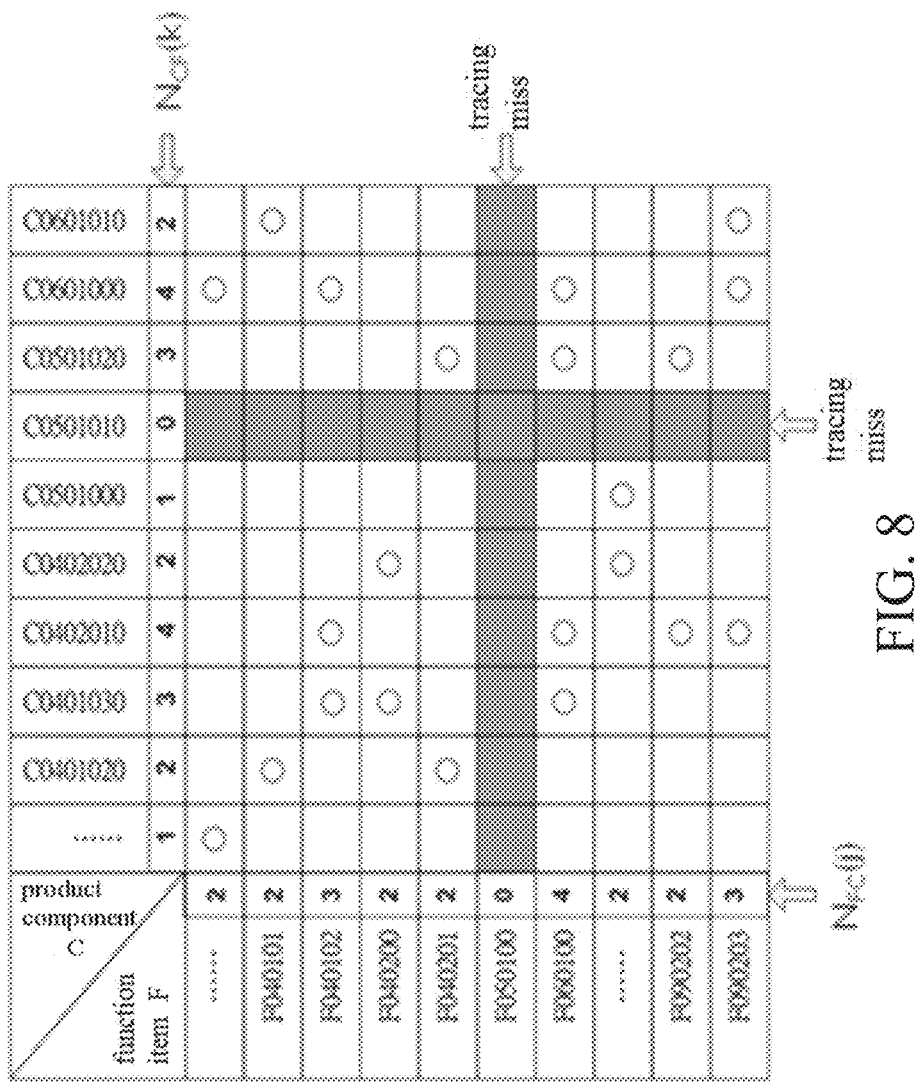
FIG. 8 is a schematic diagram showing one display interface of a traceability table of component structures and function items according to one embodiment of the present disclosure.

Referring to FIG. 8, in one embodiment of the present disclosure, take the dispersion/fineness indices which the product function items bi-directionally trace to the product component structures for an example, the definition and the management aspect thereof are illustrated as follows:

the dispersion index $D_{FC}$ which the product function item is allocated in the product component items is defined as follows:

an accumulated value of $N_{FC}(j)$ of the product function items is divided by a leaf function item summation number m, i.e. $D_{FC}=(\Sigma N_{FC}(j))/m$,=1–m;

wherein $N_{FC}(j)$ means a number which the individual product function item is allocated in the product component items;

if $N_{FC}(j)$ is 0, this means a tracing miss of the product function item;

if $N_{FC}(j)$ is larger than a threshold value d6 (such as 3), this means the product function item is too general, and should be decomposed; and if $D_{FC}$ is larger than a threshold value d7 (such as 2.5), this means the product function item seems too general; and the fineness index $F_CF$ which the product component item traces to the product function items is defined as follows:

an accumulated number of $N_{CF}(k)$ of leaf component items is divided by a leaf component number s, i.e. $F_{CF}=(\Sigma N_{CF}(k))/s$, k=1–s;

$N_{CF}(k)$ means a number which the individual product component item traces to the product function items, if $N_{CF}(k)$ is 0, this means a tracing miss of the product component item;

if $N_{CF}(k)$ is larger than a threshold value d8 (such as 15), whether a function load of the product component item is reasonable should be checked;

if $F_{CF}$ is less than a threshold value d9 (such as 2.5), this means a definition which the product component item of the product is defined by the product function items is insufficient; and if $F_{CF}$ is larger than a threshold value d10 (such as 8), this means the function load of the product component item is too ambiguous, or the product component item is able to be further divided into more fine units.

Concepts of the examples of the dispersion/fineness indices which the product function items bi-directionally trace to the product requirement specifications and the dispersion/ fineness indices which the product function items bi-directionally trace to the product component structures can be applied to the dispersion/fineness indices which the product test items bi-directionally trace to the product function items, and the dispersion/fineness indices which the product test cases bi-directionally trace to the product function items, and since the definitions of the indices are similar to those of the above indices, thus omitting the redundant descriptions. Furthermore, for example, after the product development management system determines any one index with the threshold value, the product development management system uses the user interface to alarm the user, such as presenting by using an alarming mark, or recording the comparison results in the electronic file, database or memory unit, such that the product development management system can further perform the next processes.

In one embodiment of the present disclosure, the product development management system can freeze the specific work items when the product is developed in some stage. The specific work items can be one or more kinds of the product requirement specification items, the product function items, the product component items and product test items, and that is, one kind of work items is frozen, or kinds of the work items are frozen. For example, after the product development specifications are confirmed and before the manger sends the frozen order of the requirement specification items, the upper manager checks all of the product requirement specification items and sends the frozen notification to the principal of the requirement specification which is not confirmed in the system, and when the limitation time is elapsed, the frozen confirmation action of the system is forcedly executed. When the frozen confirmation action starts, the recorded states of the requirement specifications are changed to "F", and that is, the updating and substitution of the reference electronic files are stopped.

Figure 9:
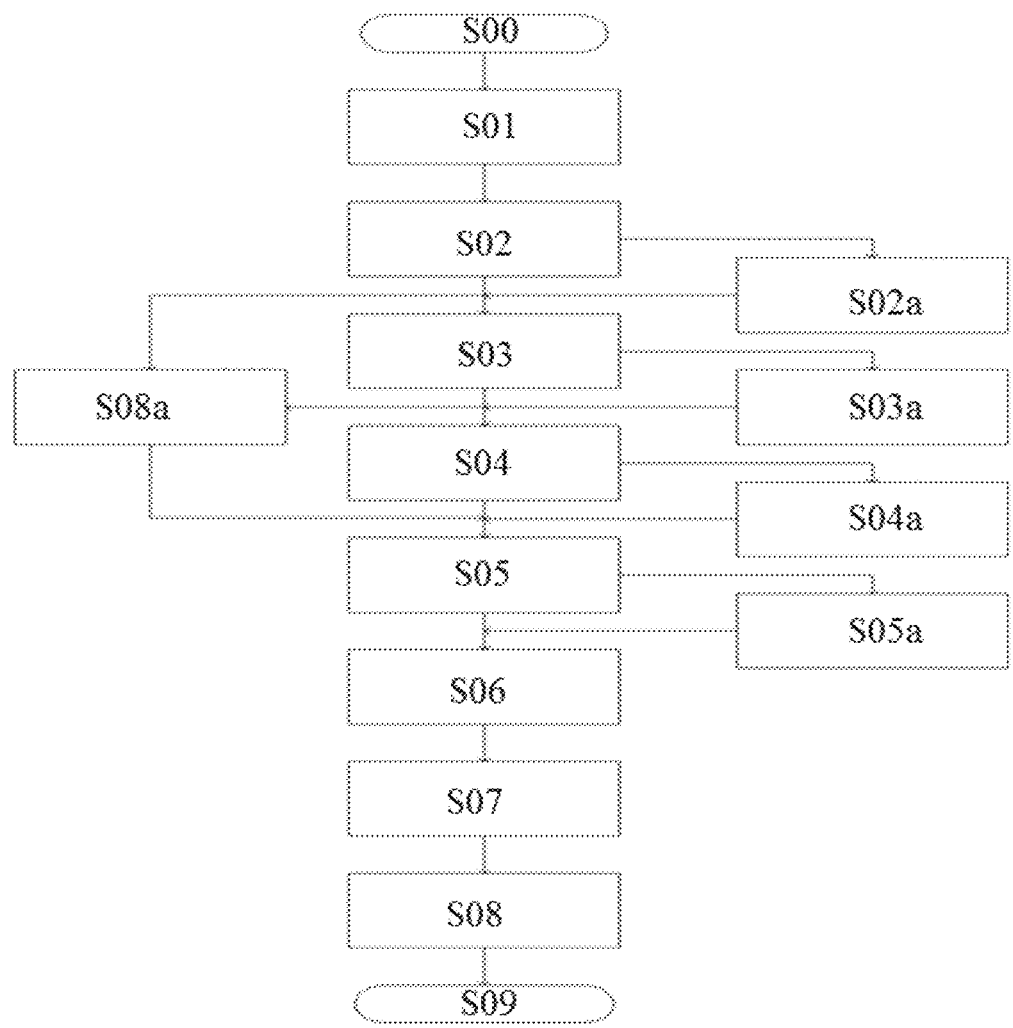
FIG. 9 is a flow chart of a product development management method used in a product development management system according to one embodiment of the present disclosure.

FIG. 9 is a flow chart of a product development management method used in a product development management system according to one embodiment of the present disclosure. As shown in the drawings, the product development management method comprises steps of:

starting a product project (step S00);

establishing a product development project team (step S01), the team comprises the product requirement specification planning stage principal, the product function item planning stage principal, the product component structure designing stage principal, the product test planning and designing stage principal, the common component management principal and the product actual testing stage principal, or alternatively, the principals can be also classified according the technical field of electronic, mechanic, material and information, or alternatively, team can comprises the customer service principal, the upper manager, the risk manager and system engineering manager of different characteristics;

establishing and maintaining core information of product requirement specifications (step S02), the core information of the product requirement specifications is contents of the product requirement specification items, when the product specification principals edit or delete one product requirement specification item, the system sends the alarming notification to the product function item principals related to the product requirement specification item, and generates the eye-catching mark on the edited/deleted item via the human-machine interface, if the edition/deletion of the product requirement specification item is confirmed, the system re-computes the hash value of the product requirement specification item, and sends the alarming notification to the product function item principals related to the product requirement specification item;

establishing and maintaining core information of product function baselines (step S03), the core information of the product function baselines comprises contents of the product requirement specification items, the product function items and the traceability table of function items and requirement specifications, when the product function item principals edit or delete one product function item, the system sends the alarming notification to the work item (comprising the product component items and product test items) principals related to the product function item, and generates the eye-catching mark on the edited/deleted item via the human-machine interface, if the edition/deletion of the product function item is confirmed, the system re-computes the hash value of the product function item, and sends the alarming notification to the product function item principals related to the product function item;

establishing and maintaining core information of product allocation baselines (step S04), the core information of the product allocation baselines comprises contents of the product requirement specification items, the product function items, the product component items, a table which the product function items trace to the specifications and the traceability table of product components and function items, when the product component item principals edit or delete one product component item, the system sends the alarming notification to the work item (product function item) principals related to the product function item, and generates the eye-catching mark on the edited/deleted item via the human-machine interface, if the edition/deletion of the product component item is confirmed, the system re-computes the hash value of the product component item, and sends the alarming notification to the product function item principals related to the product component item;

establishing and maintaining core information of product test readiness (step S05), the core information of the product test readiness comprises contents of the product requirement specification items, the product function items, the product test items (cases), a table which the product function items trace to the specifications and a table which the product test item (case) trace to the product function items, when the product test item principals edit or delete one product component item, the system sends the alarming notification to the work item principals related to the product test item (case), and generates the eye-catching mark on the edited/deleted item via the human-machine interface, if the edition/deletion of the product test item (case) is confirmed, the system re-computes the hash value of the product test item, and sends the alarming notification to the product function item principals related to the product test item;

establishing and maintaining product test results (step S06), after the product test principal completes the actual test works of contents of the product test items, the actual test results are input to fields of the product test items via a human-machine interface, the upper manager can selectively freeze the product test item after confirming that all of the product test items are finished;

establishing and maintaining core information of product published baselines (step S07), the core information of the product published baselines comprises contents of the core information of the product requirement specifications, the core information of the product function baselines, the core information of the product allocation baselines, the core information of the product test readiness and the product test results, the core information of the product published baselines is reference work data of production and usage of actual on-line product production;

extracting core information of common component baselines (step S08), after the product development management system completes the work of the product development, a common component template of specific work items (corresponding to the specific product requirement specification, function and performance requirement) and item traceability established during development process is created, such that when developing a product with similar or identical requirements in the future, a development team will use researched results of previous other one product, so as to reduce a development cost and increase a quality stability and commonness of the product; the implementation manner of the product development management method can further add a step of: selecting the core information of the common component baselines (step S08a), when maintain and establishing the work items, importing the common components established in the previous one product, so as to reuse the same product requirement specification items, the same product function items, the same product component items, the same test items (cases), the same traceability tables (A1, A2, A3) of the work items of the completed previous one product; and finishing the product development (step S09).

In one embodiment, the method shown in FIG. 9 can further add a step of: freezing the core information of the product (system) requirement specifications when the upper manager thinks this is required (step S02a), i.e. controlling the contents of all or specific ones of the product requirement specification items not to be changed anymore.

In one embodiment, the method shown in FIG. 9 can further add a step of: freezing the core information of the product (system) function baselines when the upper manager thinks this is required (step S03a), i.e. controlling the contents of all or specific ones of product requirement specification items and product function items, and the traceability table A1 not to be changed anymore.

In one embodiment the method shown in FIG. 9 can further add a step of: freezing the core information of the product (system) allocation baselines when the upper manager thinks this is required (step S04a), i.e. controlling the contents of all or specific ones of function baselines and the traceability table A2 not to be changed anymore.

In one embodiment, the method shown in FIG. 9 can further add a step of: freezing the core information of the product (system) product test readiness when the upper manager thinks this is required (step S05a), i.e. controlling the contents of all or specific ones of the allocation baselines and the product test items, and the traceability table A3 not to be changed anymore.

Referring to FIG. 10, FIG. 10 is a schematic diagram showing traceability of an application of camera drone by using a product development management system according to one embodiment of the present disclosure. As shown in the drawings, row R presents the product requirement specification items, row F presents the product function items, and row C presents the product component items. From the drawings, the engineering data and performance indices of the specifications, functions, component design in the camera drone product development can be known clearly. Each work item can be executed and managed by one or more users. For example, the requirement specification R01 of the camera drone is "taking off and landing without the runway", the correspondingly generated product function item F01 is "multi-axes structure", and the product component items for implementing the product function item F01 comprises five product component items C01 of "main body structure" through C05 of "camera supporter". The user can trace the product function items to from the component item, or form the product function item to the product requirement specification items. For example, the product component item C07 of "flight control main board" belongs under the product function item F02 of "main structure weight", and that is, the flight control main board of the camera drone is essential and directly affects the main structure weight. Meanwhile, the flight control main board is also related to the product function items F06 and F07 of "posture control function" and "residual electricity monitoring". Because the under levels of the flight control main board have the components, such as, the gyroscope, the micro-controller and the power meter. Thus, the flight control main board is related to the posture control and the electricity monitoring. The application of product development management system of present disclosure for the actual product development can be explained by the embodiment of FIG. 10, and from the embodiment, it can be known that the product development management system of the present disclosure can efficiently manage the contents of each stage work in the product development chain, and the traceability of the product requirement specifications, functions and component structure are clearly presented. The users and the upper managers can not only understand the proceeding of the product development, development states and cooperation relations of different work teams and labors quickly, but also know whether problems of the tracing misses of work items and load overconcentration or dispersion occur in the product development plan according to the tracing numbers of the work items. Thus, the present disclosure has enhancement and improvement for the aspects of handling product development project proceeding and concentration, alarming work item tracing misses, freezing the product development stage and reusing the product development results.

According to the above embodiments, the present disclosure can provide a product development management method, comprising: providing a product development management system, comprising: a product requirement specification module, used to establish product requirement specification items of a product; a product function item module, used to categorize the product requirement specification items according to professional technical fields, so as to generate product function items corresponding to the product requirement specification items; a product component module, used to establish corresponding product component items according to the product function items; a product test module, used to establish corresponding product test items according to the product function items; wherein the product development management system is installed in at least one computer host, and linked to user terminal devices via a communication network, the product development management system responds a control message which each user terminal device generates through a human-machine interface, so as to manage contents of the product requirement specification items, the product function items, the product component items and the product test items which the development management system establishes, and further to manage traceabilities between items; when the contents of one item is changed, the product development management system generates alarming marks on the changed item and other items with traceability relation of the changed item, wherein all work data of the product development management system are stored in at least one database.

Furthermore, the traceability of the product requirement specification items and product function items is presented by a product function item and traced product requirement specification table, the traceability of the product function items and the product component items is presented by a product component structure and traced product function item table, the traceability of the product test items and the product function items is presented by a product test item and traced product function item table.

Moreover, the product development management method further comprises: establishing and maintaining core information of product requirement specifications, and the core information of the product requirement specifications is contents of the product requirement specification items; establishing and maintaining core information of product function baselines, and the core information of the product function baselines comprises contents of the product requirement specification items, the product function items and the traceability table of function items and requirement specifications; establishing and maintaining core information of product allocation baselines, the core information of the product allocation baselines comprises contents of the product requirement specification items, the product function items, the product component items, a table which the product function items trace to the specifications and the traceability table of product components and function items; establishing and maintaining core information of product test readiness, the core information of the product test readiness comprises contents of the product requirement specification items, the product function items, the product test items, a table which the product function items trace to the specifications and a table which the product test item trace to the product function items; establishing and maintaining product test results, after actual test works of contents of the product test items are finished, actual test results are input to fields of the product test items via a human-machine interface; establishing and maintaining core information of product published baselines, the core information of the product published baselines comprises contents of the core information of the product requirement specifications, the core information of the product function baselines, the core information of the product allocation baselines, the core information of the product test readiness and the product test results, the core information of the product published baselines is reference work data of production and usage of actual on-line product production; and extracting core information of common component baselines, after the product development management system completes the work of the product development, creating a common component template of specific work items and item traceability during development process, such that when developing a product with similar or identical requirements in the future, a development team will use researched results of previous other one product, so as to reduce a development cost and increase a quality stability and commonness of the product.

Additionally, in some embodiments, a non-transitory computer-readable recording medium is provided that records program codes for causing a computing device (such as the aforementioned computer) to execute a product development management method, wherein the method includes, as previously described product development management method of any embodiment or any combination thereof. The codes are, for example, one or more programs or program modules, such as the steps respectively used to implement the aforementioned product development management method. For another example, the program module further comprises a block or a combination of FIG. 1 through FIG. 4. The modules work in conjunction, and can be executed in any suitable order. When the codes are executed by the computing device (such as the aforementioned at least one computer), the computing device can be caused to execute a product development management method of an embodiment. Examples of these recording media are, but not limited to, optical information storage media, magnetic information storage media or memories such as memory cards, firmware or ROM or RAM.

In summary, the present disclosure provides a product development management system, which clearly presents the product specification traceability of the work items of the product requirement specification defining, the product function item planning, the product software and hardware structure designing during the life cycle of the product development, such that the user and manager can handle the development work proceeding, the work item allocation and the tracing miss alarm. By using the product development management system of the present disclosure, the teams in the different graphical regions can understand the relation of their responsible engineering works, so as to achieve a cooperation result. The present disclosure uses the hash function to manage the change statuses of the work items, so as to avoid that the product development process and proceeding are affected since the related work items cannot instantly change while the department in the product development chain unauthorizedly changes the contents of the work items. The product development management system of the present disclosure can manage the specification change process of each stage and freeze the baseline specification and engineering data. The product development management system of the present disclosure can save the common component templates of the product researching results, and the common component templates can be referenced or reused in the next product development, such that the development cost and labor of the product of similar type can be decreased, and quality stability and commonness of the product components can be increased. The product development management system of the present disclosure can be built in a computer host, and the users can use it via the network, or alternatively, the modules of the system can be individually installed in the different hosts and the hosts link to each other to form a cloud system, thus breaking through the time and space limitation that the work teams are located in different graphical regions for the globalization of modern enterprise management, and enhancing the increment the product value.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A product development management system, comprising:
    at least one computer host, linked to user terminal devices via a communication network;
    a product requirement specification module, stored in the at least one computer host, the product requirement specification module, when executed, causing the at least one computer host to establish product requirement specification items of a product;
    a product function item module, stored in the at least one computer host and communicatively coupled to the product requirement specification module, the product function item module, when executed, causing the at least one computer host to categorize the product requirement specification items according to professional technical fields, so as to generate product function items corresponding to the product requirement specification items;

a product component module, stored in the at least one computer host and communicatively coupled to the product function item module, the product component module, when executed, causing the at least one computer host to establish corresponding product component items according to the product function items; and a product test module, stored in the at least one computer host and communicatively coupled to the product function item module, the product test module, when executed, causing the at least one computer host to establish corresponding product test items according to the product function items;

wherein the product development management system responds to a control message which each user terminal device generates through a human-machine interface, so as to manage contents of work items such as the product requirement specification items, the product function items, the product component items and the product test items which the development management system establishes, and further to manage traceability between items;

wherein when the contents of one item are changed, the product development management system computes completeness indices of work items and dispersion indices and fineness indices of traceability of upstream and downstream items;

wherein the dispersion index $D_{FR}$ which the product function item traces back to the product requirement specification item is defined as follows:

an accumulated value of $N_{FR}(j)$ of the product function items is divided by leaf function item summation number m, according to the formula $D_{FR}=(\Sigma N_{FR}(j))/m$, j=1-m;

wherein $N_{FR}(j)$ means a number which the individual product function item traces back to the product requirement specification items;

if $N_{FR}(j)$ is 0, this means a tracing miss of the production function item;

if $N_{FR}(j)$ is larger than a threshold value d1, this means the product function item is too general, and should be decomposed;

if $D_{FR}$ is larger than a threshold value d2, this means the product function item seems too general;

wherein the product development management system determines a comparison result of the dispersion index $D_{FR}$ with the threshold value d2 accordingly;

based on the comparison result, the product development management system generates alarming marks on the changed item and other items with traceability relation of the changed item, wherein all work data of the product development management system are stored in at least one database;

the product development management system uses a user interface to alarm the user according to the comparison result to allow the user to control the changes of the work items.

2. The product development management system according to claim 1, wherein the product requirement specification module, the product function item module, the product component module and the product test module are installed in a central computer host, and the user terminals communicate with each other via the communication network, and use different modules to cooperate according to different authorized priorities of the user terminals.

3. The product development management system according to claim 1, wherein the traceability of the product requirement specification items and product function items is presented by a product function item and traced product requirement specification table, the traceability of the product function items and the product component items is presented by a product component structure and traced product function item table, the traceability of the product test items and the product function items is presented by a product test item and traced product function item table.

4. The product development management system according to claim 1, further comprising a product measuring parameter module, stored in the at least one computer host, the product measuring parameter module, when executed, causing the at least one computer host to supervise product measuring parameters related to important characteristics and key performances of product development, and to establish product measuring parameter items of the product, and each product measuring parameter at least traces one specific product function item, and traces development via test results.

5. The product development management system according to claim 1, wherein the product development management system stores an electronic document associated with the product requirement specification items, the product function items, the product component items and the product test items, and supervises deletion and change of the electronic document by using a hash function to hash the electronic document.

6. The product development management system according to claim 1, wherein the product development management system prohibits any change of items by stage or by times, so as to freeze a current product development state and establish baseline data corresponding to the stages.

7. The product development management system according to claim 1, wherein when the contents of the product requirement specification items, the product function items, the product component items and the product test items are updated or confirmed, a hash value is generated according to a hash function, any deletion and change instantly changes the hash value, corresponding tables recording traceability of upstream and downstream items also records an upstream item hash value of a current state, when the hash value is inconsistent with the current state, a downstream item principal is notified automatically.

8. The product development management system according to claim 1, wherein after a product development work has been completed, the product development management system creates a common component template of specific work items established during development process, and the common component template comprises contents of items and traceability of items.

9. The product development management system according to claim 1, wherein the fineness index $F_{RF}$ which the product requirement specification item extends to the product function items is defined as follows:

an accumulated value of $N_{RF}(i)$ of the product requirement specification items is divided by a total number n of the product requirement specification items, i.e. $F_{RF}=(\Sigma N_{RF}(i))/n$, i=1-n;

wherein $N_{RF}(i)$ means a number which the individual product requirement specification item extends to the product function items;

if $N_{RF}(i)$ is 0, this mean a tracing miss of the product requirement specification item;

if $N_{RF}(i)$ is larger than a threshold value d3, this means whether the content of the product requirement specification is reasonable should be checked;

if $F_{RF}$ is less than a threshold value d4, this means a technical category which the product requirement specification item of the product extends to the product function items is not fine;

if $F_{RF}$ is larger than a threshold value d5, this means the product requirement specification item of the product is too ambiguous or not definite enough;

wherein the product development management system determines a comparison result of the fineness index $F_{RF}$ with the threshold value d4, d5 accordingly; the product development management system uses the user interface to alarm the user according to the comparison result.

10. The product development management system according to claim 1, wherein the dispersion index $D_FC$ which the product function item is allocated in the product component items is defined as follows:

an accumulated value of $N_{FC}(j)$ of the product function items is divided by a leaf function item summation number m, i.e. $D_FC=(\Sigma N_{FC}(j))/m$, j=1-m;

wherein $N_{FC}(j)$ means a number which the individual product function item is allocated in the product component items;

if $N_{FC}(j)$ is 0, this means a tracing miss of the product function item;

if $N_{FC}(j)$ is larger than a threshold value d6, this means the product function item is too general, and should be decomposed;

if $D_FC$ is larger than a threshold value d7, this means the product function item seems too general;

wherein the product development management system determines a comparison result of the dispersion index $D_FC$ with the threshold value d7 accordingly; the product development management system uses the user interface to alarm the user according to the comparison result.

11. The product development management system according to claim 1, wherein a fineness index $F_{CF}$ which the product component item traces to the product function items is defined as follows:

an accumulated number of $N_{CF}(k)$ of leaf component items is divided by a leaf component number s, i.e. $F_{CF}=(\Sigma N_{CF}(k))/s$, k=1-s;

$N_{CF}(k)$ means a number which the individual product component item traces to the product function items, if $N_{CF}(k)$ is 0, this means a tracing miss of the product component item;

if $N_{CF}(k)$ is larger than a threshold value d8, whether a function load of the product component item is reasonable should be checked;

if $F_{CF}$ is less than a threshold value d9, this means a definition which the product component item of the product is defined by the product function items is insufficient;

if $F_{CF}$ is larger than a threshold value d10, this means the function load of the product component item is too ambiguous, or the product component item is able to be further divided into more fine units;

wherein the product development management system determines a comparison result of the fineness index $F_{CF}$ with the threshold value d9, d10 accordingly; the product development management system uses the user interface to alarm the user according to the comparison result.

12. The product development management system according to claim 3, wherein the product development management system executes steps of:

starting a product project;

establishing a product development project team;

establishing and maintaining core information of product requirement specifications, and the core information of the product requirement specifications is contents of the product requirement specification items;

establishing and maintaining core information of product function baselines, and the core information of the product function baselines comprises contents of the product requirement specification items, the product function items and the traceability table of function items and requirement specifications;

establishing and maintaining core information of product allocation baselines, the core information of the product allocation baselines comprises contents of the product requirement specification items, the product function items, the product component items, a table which the product function items trace to the specifications and the traceability table of product components and function items;

establishing and maintaining core information of product test readiness, the core information of the product test readiness comprises contents of the product requirement specification items, the product function items, the product test items (cases), a table which the product function items trace to the specifications and a table which the product test item trace to the product function items;

establishing and maintaining product test results, after actual test works of contents of the product test items (cases) are finished, actual test results are input to fields of the product test items (cases) via a human-machine interface;

establishing and maintaining core information of product published baselines, the core information of the product published baselines comprises contents of the core information of the product requirement specifications, the core information of the product function baselines, the core information of the product allocation baselines, the core information of the product test readiness and the product test results, the core information of the product published baselines is reference work data of production and usage of actual on-line product production;

extracting core information of common component baselines, after the product development management system completes the work of the product development, creating a common component template of specific work items and item traceability during development process, such that when developing a product with similar or identical requirements in the future, a development team will use researched results of previous other one product, so as to reduce a development cost and increase a quality stability and commonness of the product; and finishing the product development.

13. A product development management method, comprising:

providing a product development management system implemented by at least one computer host, linked to user terminal devices via a communication network, the product development management system comprising:
- a product requirement specification module, used to establish product requirement specification items of a product;
- a product function item module, used to categorize the product requirement specification items according to professional technical fields, so as to generate product function items corresponding to the product requirement specification items;
- a product component module, used to establish corresponding product component items according to the product function items;
- a product test module, used to establish corresponding product test items according to the product function items;
- wherein the product development management system responds to a control message which each user terminal device generates through a human-machine interface, so as to manage contents of work items such as the product requirement specification items, the product function items, the product component items and the product test items which the development management system establishes, and further to manage traceability between items;
- wherein when the contents of one item are changed, the product development management system computes completeness indices of work items and dispersion indices and fineness indices of traceability of upstream and downstream items;
- wherein the dispersion index $D_{FR}$ which the product function item traces back to the product requirement specification item is defined as follows:
- an accumulated value of $N_{FR}(j)$ of the product function items is divided by leaf function item summation number m, according to the formula $D_{FR}=(\Sigma N_{FR}(j))/m$, j=1-m;
- wherein $N_{FR}(j)$ means a number which the individual product function item traces back to the product requirement specification items;
- if $N_{FR}(j)$ is 0, this means a tracing miss of the production function item;
- if $N_{FR}(j)$ is larger than a threshold value d1, this means the product function item is too general, and should be decomposed;
- if $D_{FR}$ is larger than a threshold value d2, this means the product function item seems too general;
- wherein the product development management system determines a comparison result of the dispersion index $D_{FR}$ with the threshold value d2 accordingly;
- based on the comparison result, the product development management system generates alarming marks on the changed item and other items with traceability relation of the changed item, wherein all work data of the product development management system are stored in at least one database;
- the product development management system uses a user interface to alarm the user according to the comparison result to allow the user to control the changes of the work items.

14. The product development management method according to claim 13, wherein the traceability of the product requirement specification items and product function items is presented by a product function item and traced product requirement specification table, the traceability of the product function items and the product component items is presented by a product component structure and traced product function item table, the traceability of the product test items and the product function items is presented by a product test item and traced product function item table.

15. The product development management method according to claim 14, further comprising:
- establishing and maintaining core information of product requirement specifications, and the core information of the product requirement specifications is contents of the product requirement specification items;
- establishing and maintaining core information of product function baselines, and the core information of the product function baselines comprises contents of the product requirement specification items, the product function items and the traceability table of function items and requirement specifications;
- establishing and maintaining core information of product allocation baselines, the core information of the product allocation baselines comprises contents of the product requirement specification items, the product function items, the product component items, a table which the product function items trace to the specifications and the traceability table of product components and function items;
- establishing and maintaining core information of product test readiness, the core information of the product test readiness comprises contents of the product requirement specification items, the product function items, the product test items, a table which the product function items trace to the specifications and a table which the product test item trace to the product function items;
- establishing and maintaining product test results, after actual test works of contents of the product test items are finished, actual test results are input to fields of the product test items via a human-machine interface;
- establishing and maintaining core information of product published baselines, the core information of the product published baselines comprises contents of the core information of the product requirement specifications, the core information of the product function baselines, the core information of the product allocation baselines, the core information of the product test readiness and the product test results, the core information of the product published baselines is reference work data of production and usage of actual on-line product production; and
- extracting core information of common component baselines, after the product development management system completes the work of the product development, creating a common component template of specific work items and item traceability relationship during development process, such that when developing a product with similar or identical requirements in the future, a development team will use researched results of previous other one product, so as to reduce a development cost and increase a quality stability and commonness of the product.

* * * * *